(12) United States Patent
Zvenigorodsky et al.

(10) Patent No.: US 8,677,021 B1
(45) Date of Patent: Mar. 18, 2014

(54) DOWNLOAD IN PLACE

(75) Inventors: Alex Zvenigorodsky, Redwood City, CA (US); Alex Pomeranz, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 13/214,568

(22) Filed: Aug. 22, 2011

(51) Int. Cl.
*G06F 15/16* (2006.01)

(52) U.S. Cl.
USPC .......................... 709/247; 709/203; 709/224

(58) Field of Classification Search
USPC ................... 709/247, 231, 203, 224
See application file for complete search history.

(56) References Cited

U.S. PATENT DOCUMENTS

| | | | |
|---|---|---|---|
| 5,931,909 A * | 8/1999 | Taylor .......................... 709/221 |
| 2002/0012471 A1* | 1/2002 | Nayyar ......................... 382/239 |
| 2006/0129627 A1* | 6/2006 | Phillips et al. ................ 709/200 |
| 2006/0136964 A1* | 6/2006 | Diez et al. ...................... 725/37 |
| 2006/0168147 A1* | 7/2006 | Inoue et al. ................... 709/219 |
| 2007/0099703 A1* | 5/2007 | Terebilo ..................... 463/42 |
| 2008/0114950 A1* | 5/2008 | Graham ...................... 711/161 |
| 2008/0127174 A1* | 5/2008 | Johnson ...................... 717/174 |
| 2009/0325690 A1* | 12/2009 | Zhou et al. ...................... 463/29 |
| 2010/0138387 A1* | 6/2010 | Simelius ...................... 707/624 |
| 2010/0312382 A1* | 12/2010 | Ma et al. ...................... 700/236 |
| 2012/0089829 A1* | 4/2012 | Kholidy ...................... 713/153 |
| 2012/0158677 A1* | 6/2012 | Ron ............................. 707/693 |

\* cited by examiner

*Primary Examiner* — Philip B Tran
(74) *Attorney, Agent, or Firm* — Lowenstein Sandler LLP

(57) ABSTRACT

Systems and methods are presented for providing a persistable data decompression stream that enables large downloads to restart from a place other than the beginning if they are interrupted during the decompression process.

18 Claims, 5 Drawing Sheets

DOWNLOAD IN PLACE

TECHNICAL FIELD

Presently disclosed embodiments generally relate to delivering digital content, and more particularly to systems and methods for downloading digital content associated with video game installations and updates.

BACKGROUND

Video game downloads often take a long time to complete because of the large amount of data contained in their installation packages. Downloads taking place over the Internet often are interrupted before completion, resulting in a frustrated user having to re-start the download and hope that the next attempt is successful.

SUMMARY

Systems and methods are presented for providing a persistable data decompression stream that enables large downloads to restart from a place other than the beginning if they are interrupted during the decompression process.

Other features and advantages of the invention will be apparent in view of the following detailed description and preferred embodiments.

DETAILED DESCRIPTION

The following detailed description is made with reference to the figures. Exemplary embodiments are described to illustrate the claimed invention, not to limit its scope, which is defined by the appended claims.

Figure 1:
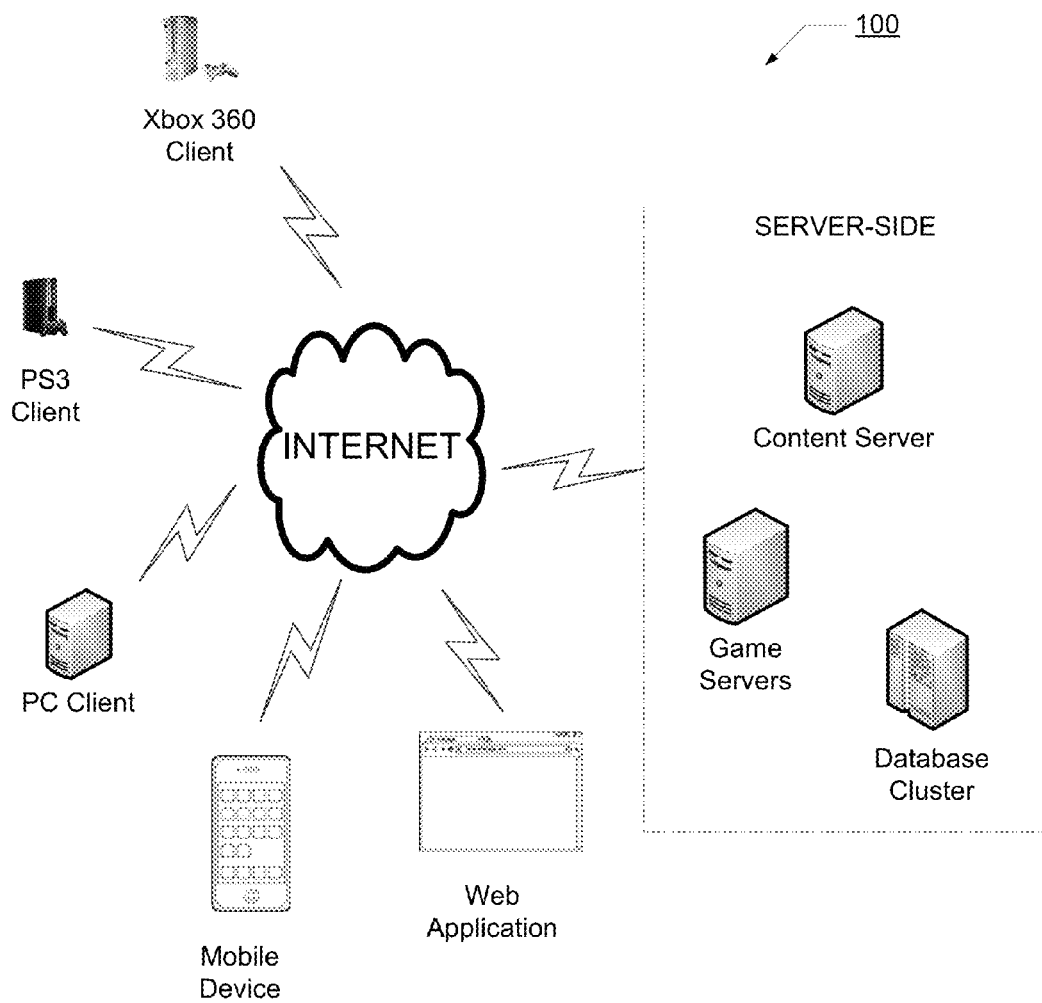
FIG. 1 is a network diagram illustrating an exemplary operating environment.

FIG. 1 is a network diagram 100 illustrating an exemplary operating environment for an embodiment of the invention. Files can be downloaded from servers to various hardware client platforms such Xbox360, Playstation 3, personal computers (PC) and mobile devices. Video game file downloads often take a long time to complete because of the large amount of data contained in their installation packages. This can present a problem when the download is taking place over the Internet because such downloads can be interrupted before completion, resulting in a frustrated user having to re-start the download and hope that the next attempt is successful.

Figure 2:
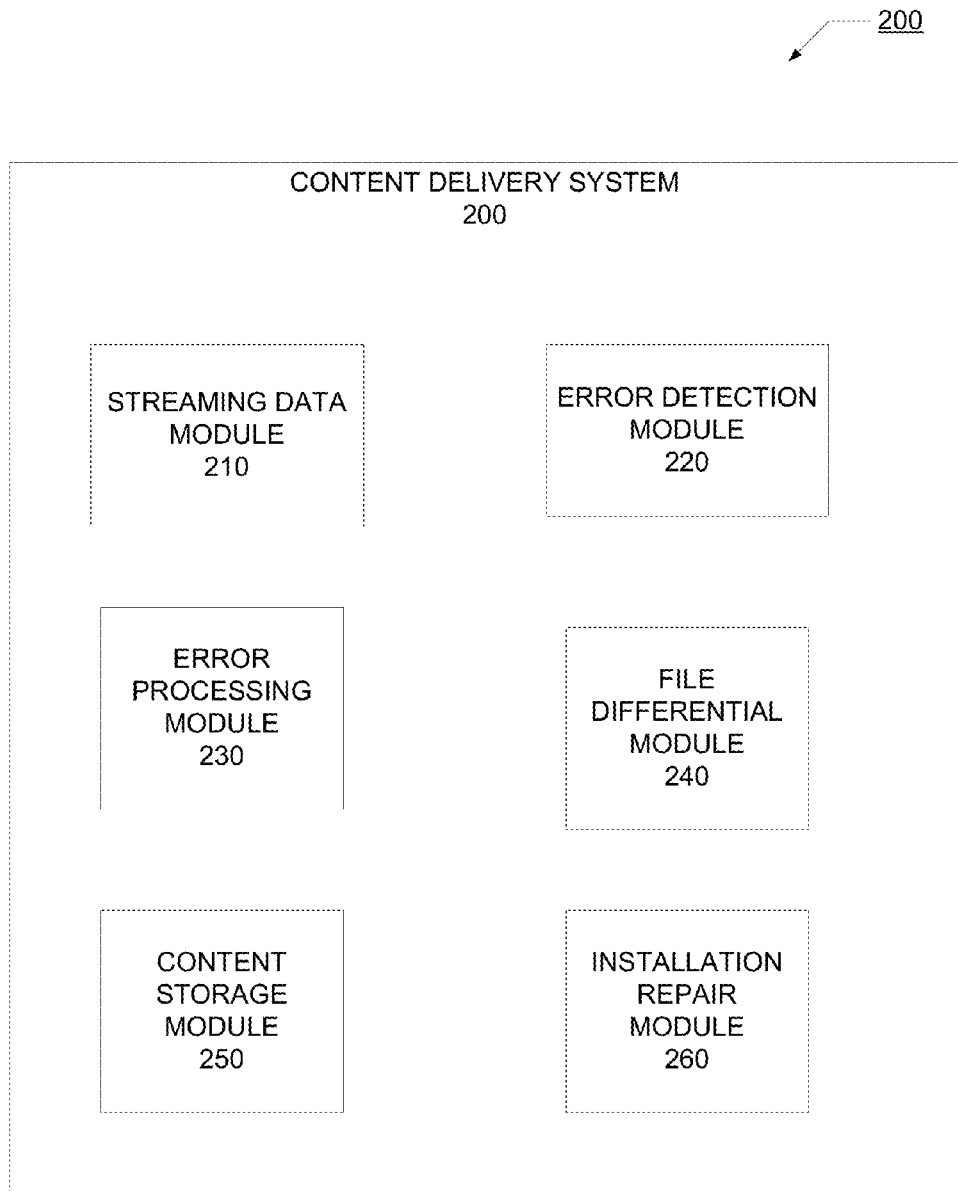
FIG. 2 is a block diagram illustrating an exemplary embodiment of a system for providing persistable data decompression.

FIG. 2 is a block diagram illustrating an exemplary embodiment of a system for providing persistable data decompression. A content delivery system 200 includes a streaming data module 210, an error detection module 220, an error processing module 230, a file differential module 240, a content storage module 250, and an installation repair module 260. Various combinations of these modules can provide structure for implementing methods described in FIGS. 3-4 below.

Figure 3:
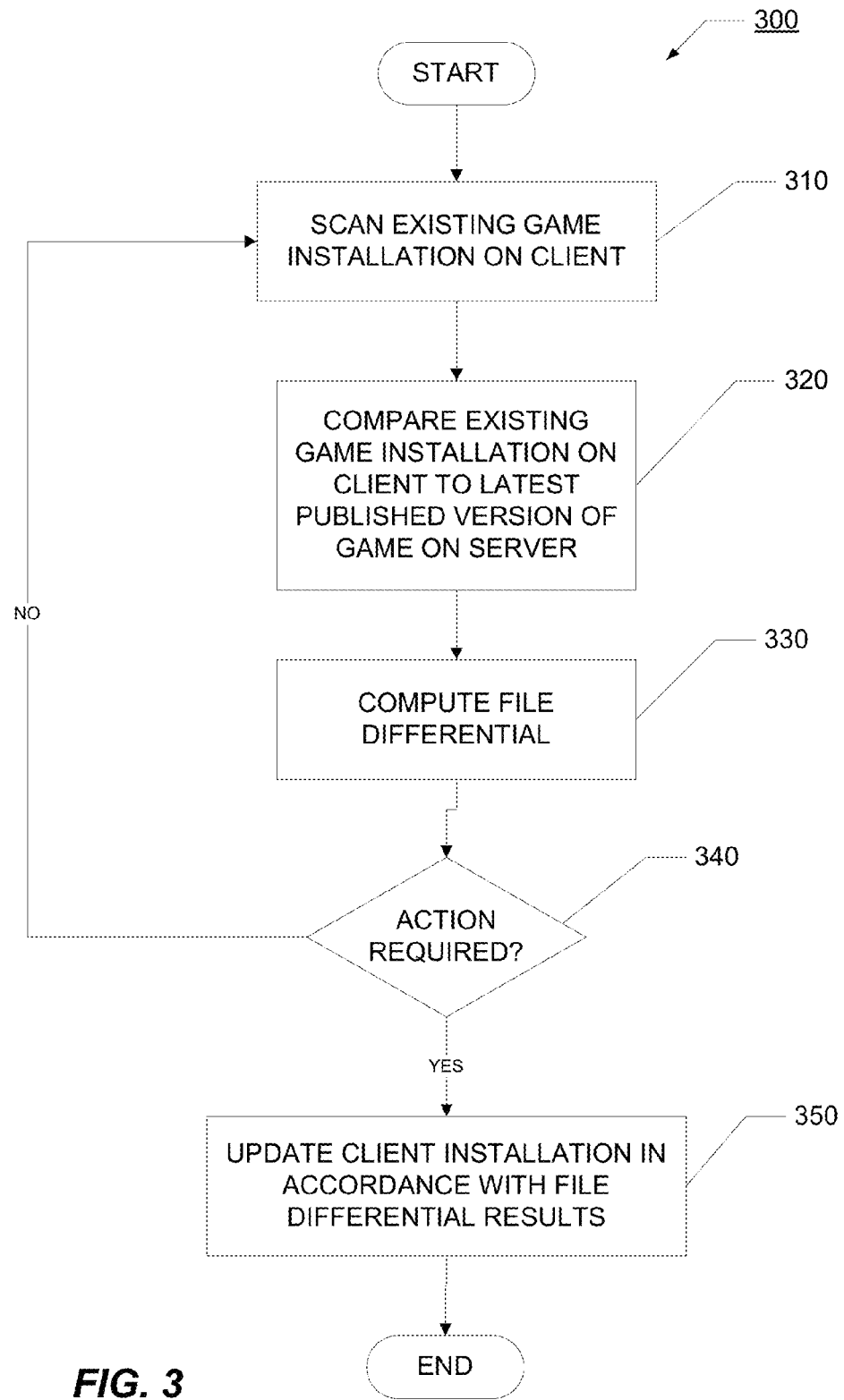
FIG. 3 is a flow chart illustrating an exemplary embodiment of a method for providing file differential updates.

FIG. 3 is a flow chart 300 illustrating a method for providing file differential updates in the context of an example where a video game installation is being checked to determine whether it needs to be updated. On a client device such as a PC, a scan is performed on the existing game installation, 310. The existing game installation on the client is compared to a preferred version of the game on a server, 320. For example, the existing game on the client can be compared to the lastest published version of the game existing on the servers owned by the company that is publishing and/or distributing the game. A file differential is determined, 330, in order to determine whether some action is required, 340. An example of where action is required would be when the game installation existing on the client device is no longer supported and requires updating. If action is required, the client installation can be updated in accordance with the file differential results, 350. By using the file differential results, the client installation can be updated to the extent the files are different, rather than updating the entire video game installation, thus saving time and resources.

Figure 4:
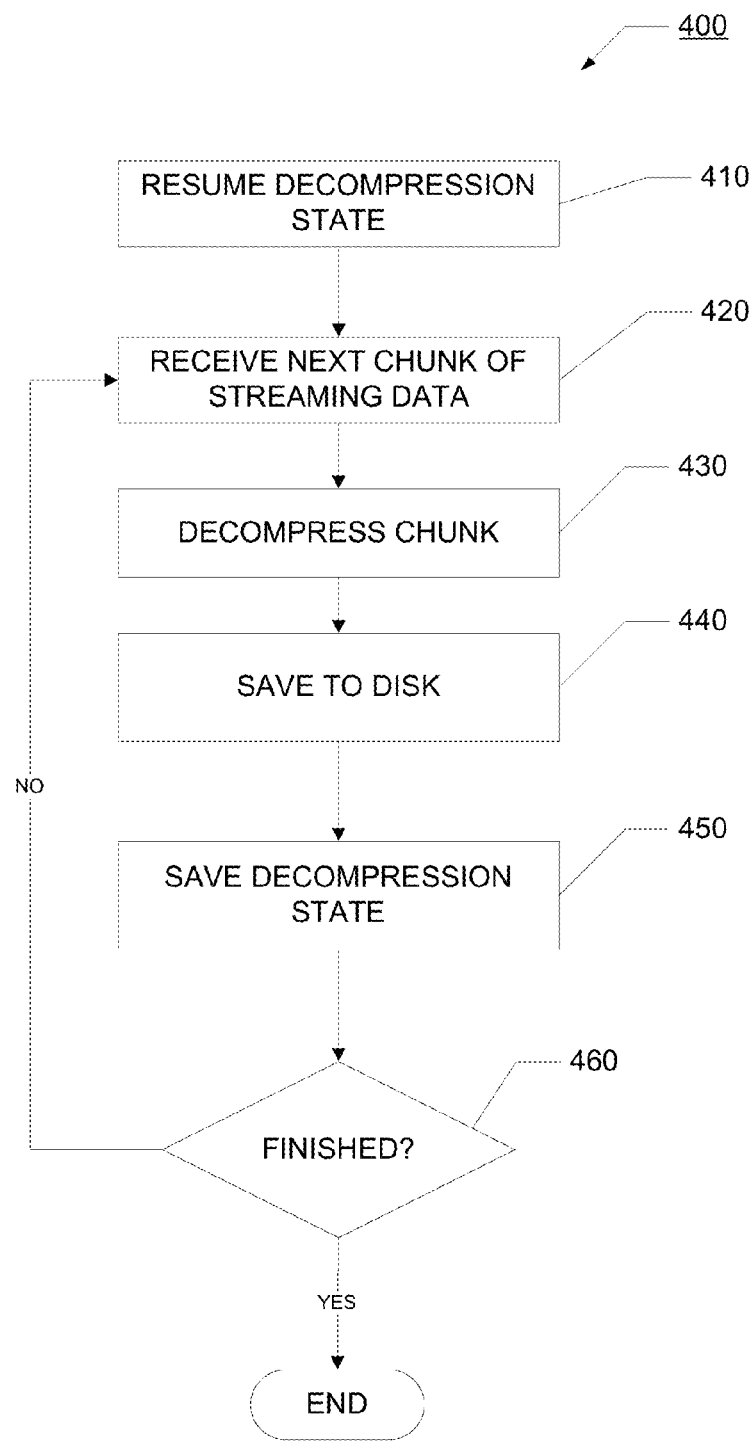
FIG. 4 is a flow chart illustrating an exemplary embodiment of a method for providing persistable data decompression.

FIG. 4 is a flow chart 400 illustrating an exemplary embodiment of a method for providing persistable data decompression which can be re-started using partial file data. In an example embodiment, a video game distribution file is decompressed over the Internet but is interrupted before the data decompression is complete. The method begins with a resume decompression state, 410. A next chunk of data is received by the client, 420. The received chunk is decompressed, 430, and saved to disk, 440. The decompression state is saved, 450. The decompression state can be saved every so often in accordance with various predetermined criteria. Alternatively, the decompression state can be saved if the download is stopped for any reason, for example, if there is an interruption in the network connection, or if the user stops the download. If the saved decompression state indicates that the decompression has not finished, 460, then a next chunk of streaming data is received by the client, 420. This process continues until the decompression is completed, 460

Figure 5:
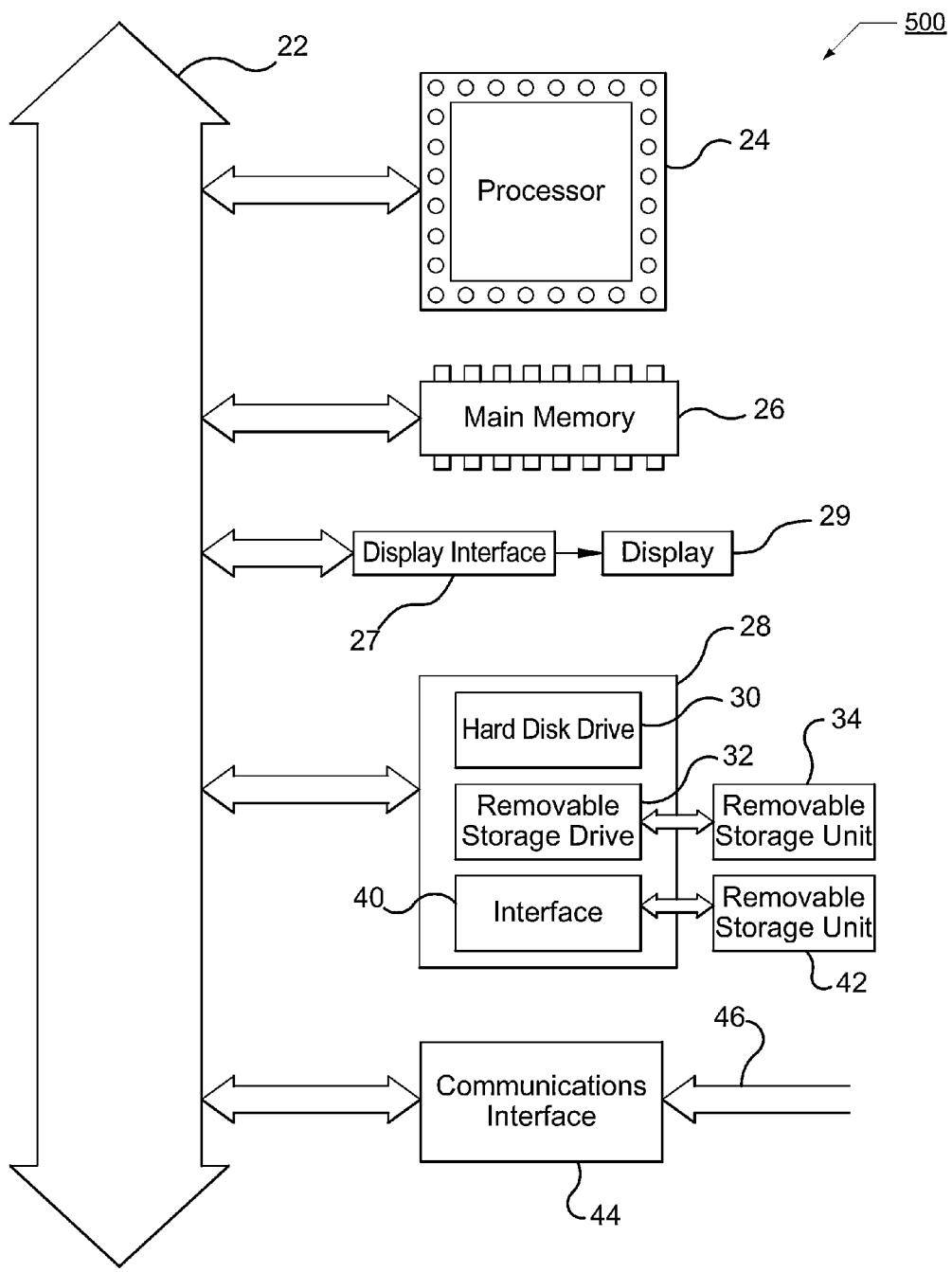
FIG. 5 is a block diagram illustrating a general purpose processing system for running methods in accordance with an exemplary embodiment.

FIG. 5 is a block diagram illustrating a general purpose processing system for running methods in accordance with an exemplary embodiment. The above-described devices, systems, and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. Multiple devices and subsystems according to the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments are for exemplary purposes, as many variations of the specific hardware used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single mobile device or computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, shared information between users, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Such computer readable media further can be non-transitory in nature. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the devices and subsystems of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the invention has been described with respect to exemplary embodiments, one skilled in the art will recognize that numerous modifications are possible. Thus, although the invention has been described with respect to exemplary embodiments, it will be appreciated that the invention is intended to cover all modifications and equivalents within the scope of the following claims.

What is claimed is:

1. A method, comprising:
   receiving a first data chunk associated with a file being decompressed, wherein the decompression has been resumed after an interruption;
   saving the first data chunk;
   determining, by a processor, a decompression state associated with the file being decompressed, wherein the decompression state indicates whether the decompression of the file is complete;
   saving the decompression state; and
   receiving a second data chunk if the decompression state indicates that the decompression is not complete.

2. The method of claim 1, further comprising determining whether or not the decompression is complete based on the saved decompression state.

3. The method of claim 2, wherein the decompression state is saved at time periods in accordance with a predetermined criteria.

4. The method of claim 1, further comprising:
   encountering an interruption of the decompression of the file; and
   resuming decompression of the file after the interruption.

5. The method of claim 1, further comprising:
- scanning a client to determine if the file is installed on the client;
- comparing the installed file on the client to a published file version on a server; and
- computing a differential between the installed file and the published file to determine whether an action is required.

6. The method of claim 5, wherein the installed file is a video game file.

7. The method of claim 5, wherein the action is whether the installed file on the client is no longer supported and requires updating.

8. The method of claim 7, further comprising updating the installed file in accordance with the differential.

9. The method of claim 8, wherein updating comprises updating only a portion of the installed file that is different from the published file without updating the entire installed file.

10. A non-transitory computer-readable storage medium with an executable program stored thereon, wherein the program instructs a processor to perform operations comprising:
- receiving a first data chunk associated with a file being decompressed, wherein the decompression has been resumed after an interruption;
- saving the first data chunk;
- determining, by the processor, a decompression state associated with the file being decompressed, wherein the decompression state indicates whether the decompression of the file is complete; and
- saving the decompression state; and
- receiving a second data chunk if the decompression state indicates that the decompression is not complete.

11. The non-transitory computer-readable storage medium of claim 10, wherein the program instructs the processor to perform further operations comprising determining whether or not the decompression is complete based on the saved decompression state.

12. The non-transitory computer-readable storage medium of claim 11, wherein the decompression state is saved at time periods in accordance with a predetermined criteria.

13. The non-transitory computer-readable storage medium of claim 10, wherein the program instructs the processor to perform further operations comprising:
- encountering an interruption of the decompression of the file; and
- resuming decompression of the file after the interruption.

14. The non-transitory computer-readable storage medium of claim 10, wherein the program instructs the processor to perform further operations comprising, further comprising:
- scanning a client to determine if the file is installed on the client;
- comparing the installed file on the client to a published file version on a server; and
- computing a differential between the installed file and the published file to determine whether an action is required.

15. The non-transitory computer-readable storage medium of claim 14, wherein the action is whether the installed file on the client is no longer supported and requires updating.

16. The non-transitory computer-readable storage medium of claim 15, wherein the program instructs the processor to perform further operations comprising updating the installed file in accordance with the differential.

17. The non-transitory computer-readable storage medium of claim 16, wherein updating comprises updating only a portion of the installed file that is different from the published file without updating the entire installed file.

18. The non-transitory computer-readable storage medium of claim 10, wherein the installed file is a video game file.

* * * * *